(12) United States Patent
Knuchel

(10) Patent No.: US 9,198,484 B2
(45) Date of Patent: Dec. 1, 2015

(54) ADJUSTABLE LINK

(71) Applicant: OMEGA SA, Bienne (CH)

(72) Inventor: Daniel Knuchel, Biel (CH)

(73) Assignee: OMEGA SA, Bienne (CH)

( * ) Notice: Subject to any disclaimer, the term of this patent is extended or adjusted under 35 U.S.C. 154(b) by 0 days.

(21) Appl. No.: 14/403,714

(22) PCT Filed: Dec. 10, 2013

(86) PCT No.: PCT/EP2013/076048
§ 371 (c)(1),
(2) Date: Nov. 25, 2014

(87) PCT Pub. No.: WO2014/114404
PCT Pub. Date: Jul. 31, 2014

(65) Prior Publication Data
US 2015/0107299 A1    Apr. 23, 2015

(30) Foreign Application Priority Data

Jan. 24, 2013  (EP) .................................... 13152468

(51) Int. Cl.
| | |
|---|---|
| *F16G 13/00* | (2006.01) |
| *A44C 5/08* | (2006.01) |
| *F16G 15/12* | (2006.01) |
| *F16G 15/00* | (2006.01) |
| *A44C 5/02* | (2006.01) |
| *A44C 5/14* | (2006.01) |
| *A44C 5/24* | (2006.01) |

(52) U.S. Cl.
CPC ... *A44C 5/08* (2013.01); *A44C 5/02* (2013.01); *F16G 15/00* (2013.01); *F16G 15/12* (2013.01); *A44C 5/14* (2013.01); *A44C 5/246* (2013.01)

(58) Field of Classification Search
CPC ............ A44C 5/02; A44C 5/14; A44C 5/246; F16G 15/00; F16G 15/12
USPC ............................................................ 59/80
See application file for complete search history.

(56) References Cited

U.S. PATENT DOCUMENTS

| | | | | | |
|---|---|---|---|---|---|
| 1,564,563 | A | * | 12/1925 | Hadley ............................ | 59/79.3 |
| 2,429,393 | A | * | 10/1947 | Cedar ............................. | 59/79.3 |

(Continued)

FOREIGN PATENT DOCUMENTS

| | | |
|---|---|---|
| CH | 695 656 A5 | 7/2006 |
| CH | 699 067 A1 | 1/2010 |

(Continued)

OTHER PUBLICATIONS

International Search Report of PCT/EP2013/076048 dated Jan. 28, 2014.

*Primary Examiner* — David B Jones
(74) *Attorney, Agent, or Firm* — Sughrue Mion, PLLC

(57) ABSTRACT

Adjustable link for a bracelet, including first and second half links which are longitudinally movable via the cooperation of a guide device and a complementary guide device, and secured by the cooperation of arresting device and complementary arresting device. The first half link includes a longitudinal finger with a locking device having radial elastic return moveable between folded and unfolded positions, and the second half link includes a longitudinal channel allowing the finger to pass in only one of the folded or unfolded positions. In proximity to this channel, a complementary locking device cooperates, in at least one locking position, with the locking device in the other of this folded or unfolded positions. The locking device and complementary locking device together define at least two of the longitudinally separate locking positions.

21 Claims, 3 Drawing Sheets

(56) References Cited

U.S. PATENT DOCUMENTS 2,889,681 A * 6/1959 Augenstein ............... 59/82
2,943,437 A * 7/1960 Ihringer ............... 59/79.3
5,623,838 A * 4/1997 Cuche ............... 63/5.1
8,776,492 B2 * 7/2014 Knuchel ............... 59/79.3

FOREIGN PATENT DOCUMENTS

| EP | 0 737 427 A1 | 10/1996 |
| EP | 2 484 244 A1 | 8/2012 |
| FR | 2 670 995 A1 | 7/1992 |

* cited by examiner

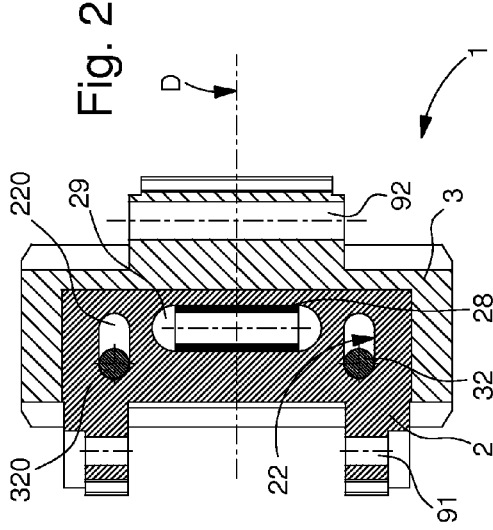
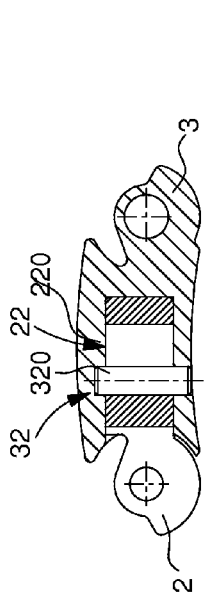
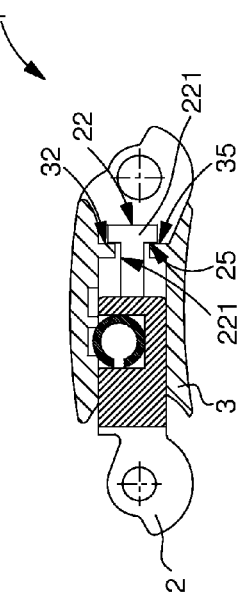
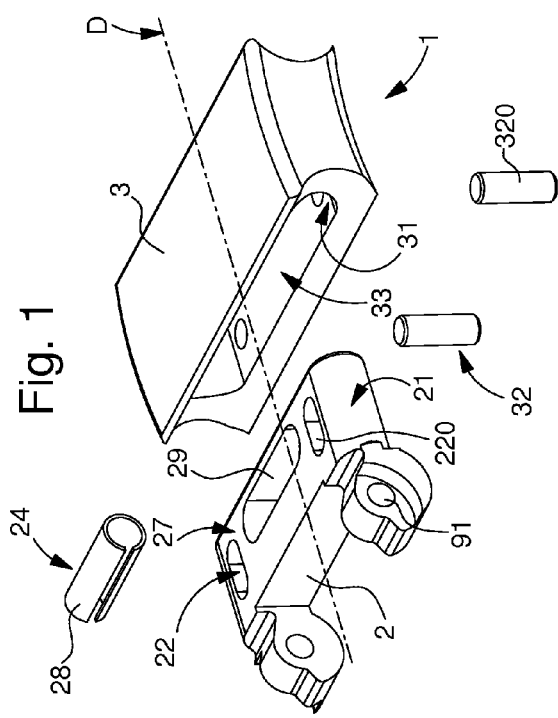
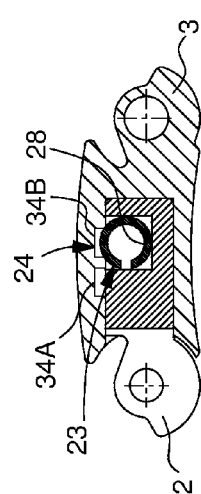
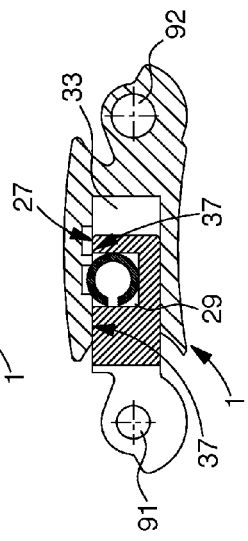

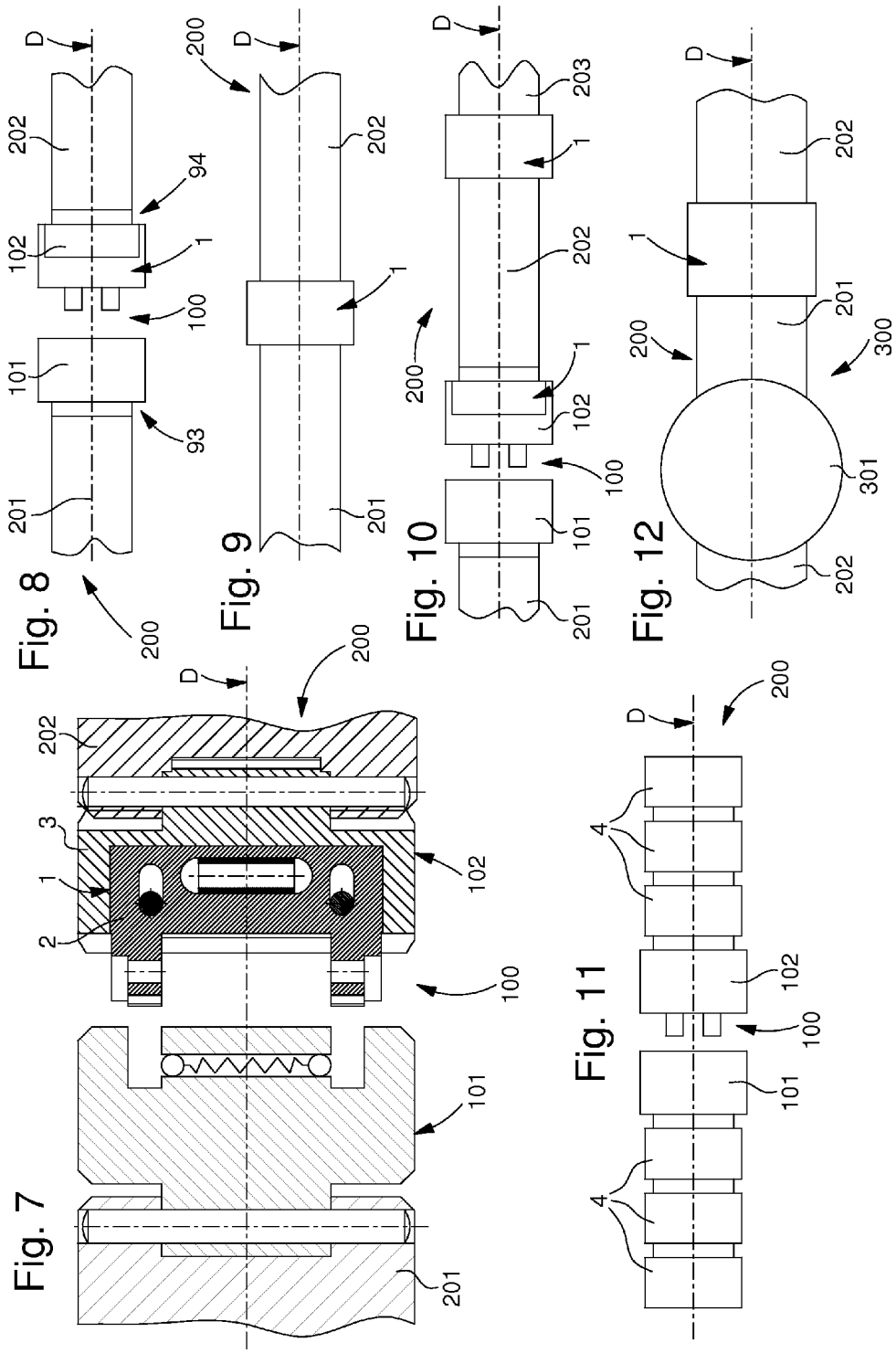

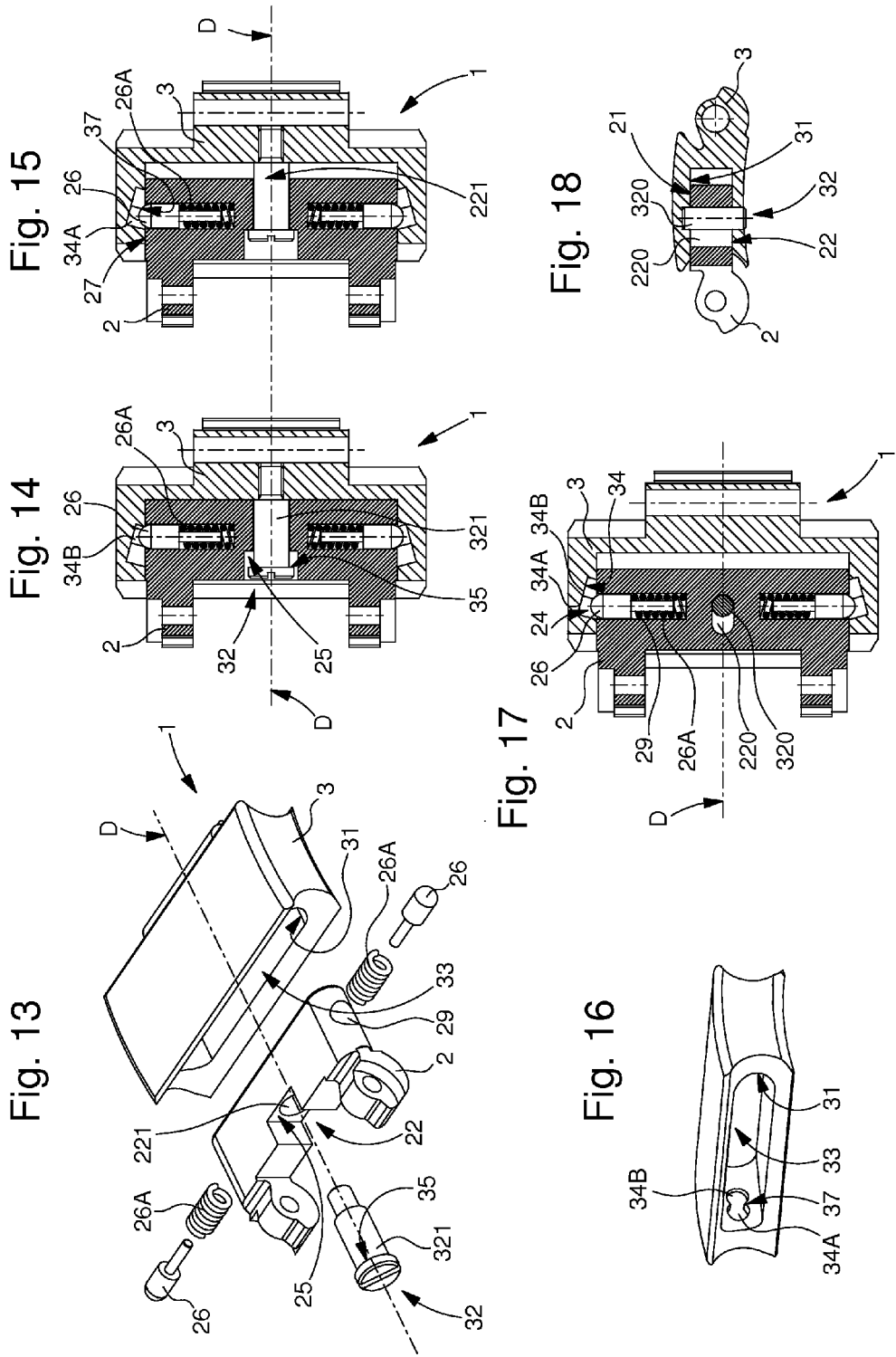

ADJUSTABLE LINK

CROSS REFERENCE TO RELATED APPLICATIONS

This application is a National Stage of International Application No. PCT/EP 2013/076048, filed Dec. 10, 2013, claiming priority based on European Patent Application No. 13152468.8, filed Jan. 24, 2013, the contents of all of which are incorporated herein by reference in their entirety.

FIELD OF THE INVENTION

The invention concerns an adjustable link for a bracelet or wristband, including at least a first half link and at least a second half link which are movable in relation to each other in a direction referred to as the "bracelet direction" and which form together an indissociable assembly, wherein:
said first half link either comprises at least one connecting and locking member, or is assembled fixedly or with restricted mobility in said bracelet direction to at least one connecting and locking member; said connecting and locking member extending transversely with respect to said bracelet direction and comprising a locking means,
said second half link either includes a complementary locking means or is assembled fixedly or with restricted mobility in said bracelet direction to a complementary locking means,
said locking means and said complementary locking means define together at least two locking positions for immobilising said first half link with respect to said second half link, said positions being discrete and remote from each other in said bracelet direction,
said locking means and/or said complementary locking means are movable, under the action of a force exerted in said bracelet direction and greater than a given value, against elastic return means respectively comprised in said complementary locking means and/or said locking means, to allow a relative change of position between said first half link and said second half link in said bracelet direction.

The invention also concerns a clasp including a first part and a second part attachable to each other by locking means.

The invention also concerns a watch case.

The invention also concerns a bracelet including at least a first and a second bracelet strand.

The invention also concerns a watch including a bracelet of this type.

The invention concerns the field of adjustable fastenings, in particular for objects intended to be worn on an animal or human body. The invention concerns in particular fastenings for bracelets, belts, straps, harnesses and similar objects, used in particular in the field of jewellery, leather goods, or even saddlery.

BACKGROUND OF THE INVENTION

Bracelets, necklaces, belts, straps and similar objects are generally fastened in an adjustable manner in predetermined positions, which allow precise re-positioning, and which the user can adjust via the cooperation of a finger with one hole among a plurality of holes, or by hooking a pin onto a rack, or a similar device. Continuous fastenings which maintain position using friction do not offer the possibility of precise re-positioning.

It is often necessary to have an adjustable length fastening, for example between two predetermined positions, to take account of climatic factors or the morphology or comfort of the user.

CH Patent No 699067 in the name of ELFIX PRODUCTION SA discloses a device for finely adjusting the length of a bracelet integrated in a clasp cover, and comprising a device for indexing in two predefined positions, and which includes spring ball push buttons, which are secured to a transverse bar, connected to one end of the bracelet and arranged to cooperate with pierced holes provided in the clasp cover.

EP Patent No 0 737 427 in the name of THE SWATCH GROUP MANAGEMENT SERVICES AG and CH Patent No 695 656 in the name of WERTHANOR SA disclose adjustable links for watch wristlets or bracelets, wherein adjustment is performed by actuating an unlocking button to change from one length indexing position to another.

FR Patent No 2 670 995 in the name of PERILLAT COLOMB discloses a bar which extends in the longitudinal direction of a bracelet, and whose ends are each engaged in a link portion in predefined indexing positions, either by spring bars, or by studs cooperating with holes provided in the bar. A tool has to be used to change from one position to another. These indexing devices extend transversely and require a significant amount of space. They are also visible and detract from the general attractiveness of the bracelet.

These known devices act transversely, generally require a tool to perform the adjustment, and remain visible.

EP Patent No 2484244 in the name of OMEGA SA discloses an adjustable link for a bracelet, including a first half link and a second half link movable with respect to each other in a longitudinal direction, by the cooperation of guide means and complementary guide means, so as to form together an indissociable assembly by the cooperation of arresting means and complementary arresting means. The first half link includes a finger extending in this direction and includes locking means with substantially radial elastic return with respect to said direction, and which are movable between a folded position and an unfolded position. The second half link includes a channel extending in this direction, which is arranged to allow the passage of the finger in only one of the unfolded or unfolded positions of the locking means. This second half link also includes, in proximity to the channel, complementary locking means for cooperating, in at least one locking position, with the locking means in the other of the unfolded or folded positions of the locking means, and the locking means and complementary locking means define together at least two discrete and remote locking positions in the longitudinal direction.

SUMMARY OF THE INVENTION

It is an object of the invention to propose a more compact solution than prior art solutions, acting in the longitudinal direction of the bracelet, using an adjustable mechanism with no particular tools, wherein the adjustment mechanism remains concealed and comprises a return means for returning the adjustable link to its shortened position.

To this end, the invention concerns an adjustable link for a bracelet, including at least a first half link and at least a second half link which are movable in relation to each other in a direction referred to as the bracelet direction, and which form together an indissociable assembly, wherein:
said first half link either comprises at least one connecting and locking member, or is assembled fixedly or with restricted mobility in said bracelet direction to at least one connecting and locking member; said connecting and locking member extending transversely with respect to said bracelet direction and comprising a locking means, said second half link either includes a complementary locking means or is assembled fixedly or with restricted mobility in said bracelet direction to a complementary locking means, said locking means and said complementary locking means define together at least two locking positions for immobilising said first half link with respect to said second half link, said positions being discrete and remote from each other in said bracelet direction, said locking means and/or said complementary locking means are movable, under the action of a force exerted in said bracelet direction and greater than a given value, against elastic return means respectively comprised in said complementary locking means and/or said locking means, to allow a relative change of position between said first half link and said second half link in said bracelet direction, characterized in that said connecting and locking member is a substantially tubular element forming an elastic return means able to occupy various positions between a contracted position where it has a minimum cross-section and a free, expanded position where it has a maximum cross-section, and extending in an orthogonal direction to said bracelet direction, and housed inside a housing of said first half link whose direction is substantially orthogonal to said direction, said housing being sized so that, in the free state, said element projects from said housing beyond a boundary surface of said first half link, said boundary surface extends parallel to said bracelet direction, and in that, in the contracted state under the effect of the application of a compressive stress or during a relative motion between said second half link and said first half link when said element is compressed by a complementary bearing surface of said second half link, said element is held within said boundary surface.

The invention also concerns a clasp including a first part and a second part attachable to each other by locking means, characterized in that at least said first part or said second part includes an adjustable link of this type.

The invention also concerns a watch case, whose middle part forms an adjustable link of this type, or incorporates an adjustable link of this type.

The invention also concerns a bracelet including at least a first and a second bracelet strand, characterized in that the bracelet includes at least one adjustable link of this type, said adjustable link being either inserted between said first strand and said second strand to which it is connected by first fastening means between said first half link and said first strand and by second fastening means between said second half link and said second strand, or incorporated in a clasp of this type, said first part being connected by first means to said first strand and said second part being connected by second fastening means to said second strand.

The invention also concerns a watch including a bracelet of this type, characterized in that one said first strand and one said second strand of said bracelet hold a watch case on both sides.

BRIEF DESCRIPTION OF THE DRAWINGS

Other features and advantages of the invention will appear more clearly upon reading the following detailed description, with reference to the annexed drawings, in which:

FIG. 1 shows an exploded, schematic, perspective view of a first variant of an adjustable link according to the invention.

FIG. 2 shows a schematic cross-section through a median plane of the adjustable link of FIG. 1, locked in a folded position.

FIG. 3 shows a schematic, longitudinal cross-section through a median plane of the adjustable link of FIG. 1, in its folded position.

FIG. 4 shows, in a similar manner to FIG. 3, the adjustable link of FIG. 1, in its unfolded position.

FIG. 5 shows a schematic, longitudinal cross-section along a plane parallel to the median plane of the adjustable link of FIG. 1 in its folded position.

FIG. 6 shows, in a similar manner to FIG. 4, the adjustable link of FIG. 1 in its unfolded position, with indissociable arresting means including a bore for the passage of a screw.

FIG. 7 shows a schematic cross-section of a clasp according to the invention, incorporating an adjustable link of FIG. 1, with the clasp in an open position.

FIG. 8 shows a schematic, plan view of a bracelet including the clasp of FIG. 7.

FIG. 9 shows a schematic, plan view of a bracelet including an adjustable link according to FIG. 1.

FIG. 10 shows a schematic, plan view of a bracelet including the clasp of FIG. 7 and an adjustable link according to FIG. 1.

FIG. 11 shows a schematic, plan view of a bracelet including the clasp of FIG. 7 and a series of hinged links.

FIG. 12 shows a schematic, plan view of a watch including a watch case held by a bracelet including an adjustable link according to FIG. 1.

FIG. 13 shows, in a similar manner to FIG. 1, a second variant of the adjustable link according to the invention.

FIG. 14 shows a schematic cross-section through a median plane of the adjustable link of FIG. 13, locked in a folded position.

FIG. 15 shows a schematic, longitudinal cross-section through a median plane of the adjustable link of FIG. 13, in its unfolded position.

FIG. 16 shows a schematic, perspective view of a second half link of the adjustable link of FIG. 13.

FIG. 17 shows, in a similar manner to FIG. 15, another embodiment of the adjustable link of FIG. 13, in its unfolded position.

FIG. 18 shows a schematic, longitudinal cross-section through a median plane of the adjustable link of FIG. 17, in its unfolded position.

DETAILED DESCRIPTION OF PREFERRED EMBODIMENTS

The invention further concerns an adjustable link 1 for a bracelet 200.

The invention concerns the field of adjustable fastenings, in particular for objects intended to be worn on a human or animal body. The invention concerns in particular fastenings for bracelets, necklaces, belts, straps, harnesses and similar objects, used in particular in the field of jewellery, leather goods, or even saddlery.

These objects, which differ in size or detailed shape but operate in a similar manner, will be referred to below by the single term "bracelet".

This adjustable link 1 for a bracelet 200, comprises at least a first half link 2 and at least a second half link 3 which are movable in relation to each other in a bracelet direction D, and which form an indissociable assembly. In a preferred but non-limiting embodiment, direction D is linear.

The first half link 2 either comprises at least one connecting and locking member 23, or is assembled fixedly or with restricted mobility in bracelet direction D to at least one connecting and locking member 23. This connecting and locking member 23 extends transversely with respect to bracelet direction D and comprises a locking means 24.

The second half link 3 either includes a complementary locking means 34 or is assembled fixedly or with restricted mobility in bracelet direction D to a complementary locking means 34.

Locking means 24 and complementary locking means 34 define together at least two locking positions for immobilising first half link 2 with respect to second half link 3; these positions are discrete and remote from each other in bracelet direction D.

Locking means 24 and/or complementary locking means 34 are movable, under the action of a force exerted in bracelet direction D and greater than a given value, against elastic return means respectively comprised in complementary locking means 34 and/or locking means 24, to allow a relative change of position between first half link 2 and second half link 3 in bracelet direction D.

The present description does not describe the case of an adjustable link with more than two half links, since those skilled in the art will have no difficulty in extrapolating this device to a variant including several adjustable stages in series.

In the preferred embodiments illustrated in the Figures, second half link 3 comprises at least one housing 33 which extends in bracelet direction D and is arranged to allow connecting and locking member 23 to pass and be held in only one of said discrete locking positions, and complementary locking means 34 is arranged in proximity to channel 33.

Preferably, the at least one first half link 2 and the at least one second half link 3 are guided with respect to each other by the cooperation of guide means 21 and complementary guide means 31 and form an indissociable assembly by the cooperation of arresting means 22 and complementary arresting means 32.

Thus, in the illustrated embodiments, the second half link 3 includes at least one channel 33 extending in bracelet direction D and including complementary guide means 31.

Complementary locking means 34 is advantageously formed by chambers 34B; 34B transverse to bracelet direction D and each corresponding to a relative position of second half link 3 with respect to first half link 2. In the first variant of FIGS. 1 to 6, these chambers 34A, 34B are separate pouches, formed by moulding, casting or machining. In the second variant of FIGS. 13 to 18, these chambers 34A, 34B are oblique holes, between which a bulge portion 37 has to be crossed to pass from one to the other, as seen in FIG. 16.

According to the invention, and particularly in the first variant of FIGS. 1 to 6, the connecting and locking member 23 is a substantially tubular element 28 forming an elastic return means able to occupy various positions between a contracted position where it has a minimum cross-section and a free and expanded position where it has a maximum cross-section. This element 28 extends in an orthogonal direction to bracelet direction D, and is housed inside a housing 29 of first half link 2 whose direction is substantially orthogonal to direction D. This housing 29 is sized so that, in the free state, element 28 projects from housing 29 beyond a boundary surface 27 of first half link 2. This boundary surface 27 extends parallel to bracelet direction D. In the contracted state, under the effect of the application of a compressive stress, or during a relative motion between second half link 3 and first half link 2 when element 28 is compressed by a complementary bearing surface 37 of second half link 3, element 28 is held within boundary surface 27. FIGS. 3 and 4 show the successive cooperation of this element 28 with chambers 34B and 34A in two positions of half links 2 and 3, respectively close to each other and remote from each other.

In the illustrated version, element 28 is a split tube spring. It may also, in a non-limiting manner, be a helical spring, or a bulge portion made of rubber or elastomer or suchlike.

In the second variant of FIGS. 13 to 18, connecting and locking member 23 is a push-piece 26 moved by a spring 26A in a housing 29 of first half link 2 whose direction is substantially orthogonal to direction D. Housing 29 is sized so that, in the free state, element 28 projects from housing 29 beyond a boundary surface 27 of first half link 2, said boundary surface 27 extending parallel to bracelet direction D. In the contracted state, under the effect of the application of a compressive stress, or during a relative motion between second half link 3 and first half link 2 when element 28 is compressed by a complementary bearing surface 37 of second half link 3, element 28 is held within boundary surface 27. FIGS. 15 and 16 show the two possible positions in this variant embodiment.

Preferably, first half link 2 and second half link 3 respectively comprise arresting means 22 and complementary arresting means 32, in bracelet direction D, for the indissociable assembly of said links in relation to each other, and to define a maximum adjustment stroke between a first close position where a first bearing surface 25 of first half link 2 is in contact with a second bearing surface 35 of second half link 3, and a second remote position where arresting means 22 is in contact with complementary arresting means 32.

In an advantageous embodiment, locking means 24 and/or complementary locking means 34 comprise at least one ramp which, under the action of a force applied in bracelet direction D to first half link 2 and/or second half link 3, and during the relative motion between first half link 2 and second half link 3, allows locking means 24 to change from the folded position to the unfolded position or vice versa.

In a first embodiment seen in FIGS. 1, 2, 5, 17 and 18, arresting means 22 is formed by an oblong hole 220 extending in direction D, and complementary arresting means 32 is formed by a pin 320 moving in oblong hole 320.

In a second embodiment seen in FIGS. 6 and 13 to 15, arresting means 22 is formed by a screw head 25, 35 or a stop surface 35, 25 arranged to cooperate in abutment, in a position of maximum extension of adjustable link 1, with a complementary stop surface 35, 25, or screw head 25, 35 respectively. FIG. 6 therefore shows a screw 221 integral with first half link 2, moving in a bore 221 of second half link 3 and wherein a surface 25 of the screw head is arranged to move into a stop position on a surface 35 comprised in second half link 3. FIG. 6 is simplified to show merely the principle of an axial stop, and does not show any decorative elements comprised in a hinged bracelet, or an adjustable link according to the invention, particularly for concealing the hinge area; naturally, in the folded position of adjustable link 1, the face of the screw head must remain sufficiently remote from the hinge pin to permit a proper connection with the remainder of the bracelet in which it is incorporated. FIG. 13 shows, conversely, a screw 321 integral with second half link 3 moving in a bore 221 of first half link 2 and wherein a surface 35 of the screw head is arranged to move into a stop position on a surface 25 comprised in first half link 2.

The invention also concerns a clasp 100 including a first part 101 and a second part 102 attachable to each other by a locking means, which is not detailed here since it is well known to those skilled in the art. According to the invention, at least the first part 101 or the second part 102 includes an adjustable link 1 of this type.

The invention also concerns a watch case 301 whose middle part forms an adjustable link 1 according to the invention, or incorporates an adjustable link 1.

The invention also concerns a bracelet 200 including at least a first bracelet strand 201 and a second bracelet strand 202. According to the invention, this bracelet 200 includes at least one adjustable link 1 of this type. This adjustable link 1 is either inserted between first strand 201 and second strand 202 to which it is connected by first fastening means 91 between first half link 2 and first strand 201 and by second fastening means 92 between second half link 3 and second strand 202 or incorporated in a clasp 100 of this type. In the first case, the first part 101 is connected by first fastening means 93 to first strand 201 and second part 102 is connected by second fastening means 94 to second strand 202.

In a particular embodiment, seen in FIG. 11, this bracelet 200 is a hinged bracelet including a series of links 4 hinged to each other and wherein at least one is an adjustable link 1 of this type. In a particular embodiment, bracelet 200 includes a clasp 100 of this type, and all the other said links 4 forming bracelet 200 are hinged to each other in an irreversible assembly preventing the disassembly thereof. In a version with a broad range of adjustment, bracelet 200 includes several links 4 of this type, each formed of an adjustable link 1 so as to cover the entire range of adjustment of bracelet 200 by combining the range of adjustment of every adjustable link.

The invention also concerns a watch 300 including a wristband 200 of this type. According to the invention, a first strand 201 and a second strand 202 of bracelet 200 hold a watch case 301 on both sides. In a particular embodiment, watch case 301 has a middle part which forms an adjustable link 1 according to the invention, or incorporates an adjustable link 1.

The invention thus satisfies the designated objects, acts in the longitudinal direction of the bracelet, with an adjustable mechanism using no particular tools, where the adjustment mechanism remains hidden and comprises return means for returning the adjustable link to its shortened position. The mechanism is adaptable to non-linear shapes and allows easy adjustment in complete security, without any risk of the bracelet being lost.

The invention claimed is:

1. An adjustable link for a bracelet, comprising at least a first half link and at least a second half link movable in relation to each other in a bracelet direction, and which form together an indissociable assembly, wherein:
    said first half link comprises:
    at least one connecting and locking member, said connecting and locking member extending transversely in said bracelet direction and comprising a locking means,
    said second half link includes a complementary locking means,
    said locking means and said complementary locking means together define at least two locking positions for immobilizing said first half link with respect to said second half link, said at least two locking positions being discrete and remote from each other in said bracelet direction,
    said locking means and/or said complementary locking means are movable, under an action of a force exerted in said bracelet direction and greater than a given value provided by an elastic return means included in said complementary locking means and/or said locking means, to allow a relative change of position between said first half link and said second half link in said bracelet direction,
    wherein said connecting and locking member is a substantially tubular element forming said elastic return means configured to assume various positions between a contracted position where the cross-section thereof is minimum and an expanded position where the cross-section thereof is maximum, and said substantially tubular element extending in an orthogonal direction of said bracelet direction, and housed inside a housing included in said first half link,
    wherein the housing extends in a direction substantially orthogonal to of said bracelet direction, said housing being sized such that, in free state, said element projects beyond a boundary surface included in said first half link, said boundary surface also extends parallel of said bracelet direction, and
    wherein, in a contracted state under an effect of an application of a compressive force applied by a relative motion between said second half link and said first half link when said element is compressed by a complementary bearing surface included in said second half link, said element is held within said boundary surface.

2. The adjustable link according to claim 1, wherein said second half link comprises at least one housing which extends in said bracelet direction and is arranged to allow said connecting and locking member to pass through the bracelet and be held in only one of said discrete locking positions, and wherein said complementary locking means is arranged in proximity to a channel of the bracelet.

3. The adjustable link according to claim 1, wherein said at least one first half link and said at least one second half link are guided with respect to each other by a cooperation of guide means and complementary guide means and form an indissociable assembly by a cooperation of arresting means and complementary arresting means.

4. The adjustable link according to claim 3, wherein said second half link includes at least one channel extending in said bracelet direction and including said complementary guide means.

5. The adjustable link according to claim 3, wherein said first half link and said second half link respectively comprise said arresting means and said complementary arresting means, arranged in said bracelet direction for an indissociable assembly of said links in relation to each other, and define a maximum adjustment stroke between a first closed position where a first bearing surface of said first half link is in contact with a second bearing surface of said second half link, and a second remote position where said arresting means is in contact with said complementary arresting means.

6. The adjustable link according to claim 3, wherein said arresting means is formed by an oblong hole extending in said bracelet direction, and wherein said complementary arresting means includes a pin moving in said oblong hole.

7. The adjustable link according to claim 3, wherein said arresting means includes a screw head or a stop surface arranged to cooperate in abutment, in a position of maximum extension of said adjustable link, respectively with a complementary stop surface or screw head.

8. The adjustable link according to claim 1, wherein said complementary locking means is formed by chambers extending transversely to said bracelet direction and each chamber corresponding to a relative position of said second half link with respect to said first half link.

9. The adjustable link according to claim 1, wherein said element is a split tube ring.

10. The adjustable link according to claim 1, wherein said element is a helical spring.

11. The adjustable link according to claim 1, wherein said element is a rubber or elastomer bulge portion.

12. The adjustable link according to claim 1, wherein said connecting and locking member is a push-piece moved by a spring in a housing of said first half link in a direction substantially orthogonal to said bracelet direction, said housing is sized so that, in said free state, said element projects from said housing beyond a boundary surface of said first half link, said boundary surface extending parallel to said bracelet direction, and wherein in said contracted state, said element is held within said boundary surface.

13. The adjustable link according to claim 1, wherein said locking means and/or said complementary locking means comprise at least one ramp which, when a force is applied in said bracelet direction to said first half link and/or said second half link, and during a relative motion between said first half link and said second half link, said locking means to changes from a folded position to an unfolded position thereof.

14. A clasp including a first part and a second part attachable to each other by the locking means, wherein at least said first part or said second part includes an adjustable link according to claim 1.

15. A watch case, wherein the watch case includes a middle part forming said adjustable link or incorporates said adjustable link according to claim 1.

16. A bracelet including at least a first bracelet strand and a second bracelet strand, wherein the bracelet includes at least one adjustable link according to claim 1, said adjustable link being either inserted between said first strand and said second strand to which said link is connected by first fastening means between said first half link and said first strand and by second fastening means between said second half link and said second strand, or incorporated in a said clasp, said first part being connected by first fastening means to said first strand and said second part being connected by second fastening means to said second strand.

17. The bracelet according to claim 16, wherein the bracelet is a hinged bracelet including a series of links hinged to each other and wherein at least one of the links is said adjustable link.

18. The bracelet according to claim 17, wherein the bracelet includes said clasp according to claim 14, and the other links in the series forming said bracelet are hinged to each other in an irreversible assembly preventing the disassembly thereof.

19. The bracelet according to claim 18, wherein the bracelet includes a plurality of said links, each formed of said adjustable link so as to cover an entire range of adjustment of said bracelet by combining a range of adjustment of all of said adjustable links.

20. The watch including a bracelet according to claim 16, wherein said first strand and said second strand of said bracelet hold a watch case on both sides.

21. The watch according to claim 20, wherein said case includes a middle part forming said adjustable link or wherein said case incorporates said adjustable link.

* * * * *